C. W. CARTER.
Trucks for Moving Rails, &c.
No. 167,221
Patented Aug. 31, 1875.
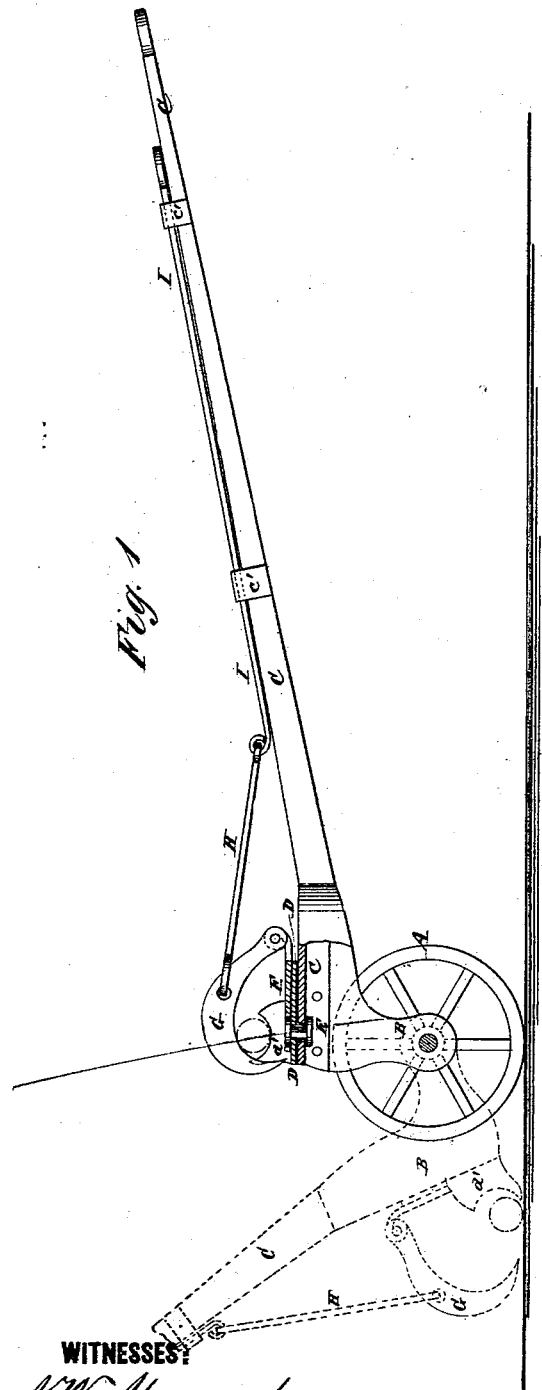
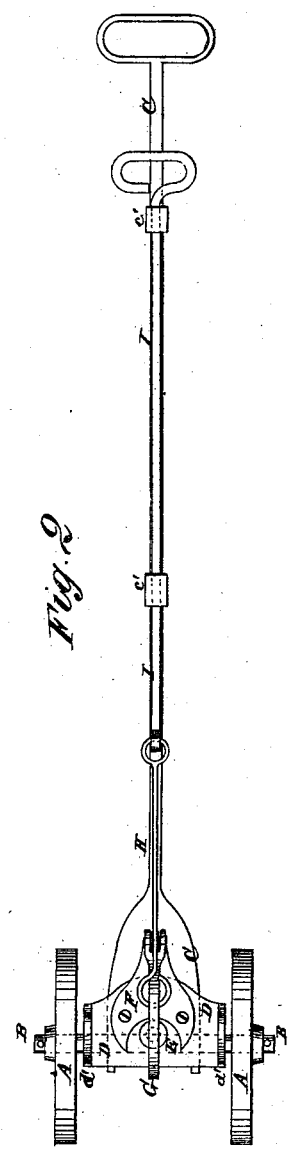
WITNESSES:
INVENTOR:
C. W. Carter
BY
ATTORNEYS.

UNITED STATES PATENT OFFICE.

CHARLES W. CARTER, OF TERRE HAUTE, INDIANA, ASSIGNOR TO HIMSELF AND GEORGE W. TRAVIS, OF CAPE GIRARDEAU, MISSOURI.

IMPROVEMENT IN TRUCKS FOR MOVING RAILS, &c.

Specification forming part of Letters Patent No. 167,221, dated August 31, 1875; application filed July 24, 1875.

*To all whom it may concern:*

Be it known that I, CHARLES W. CARTER, of Terre Haute, in the county of Vigo and State of Indiana, have invented a new and useful Improvement in Railroad-Rail Truck, of which the following is a specification:

Figure 1 is a side view of my improved truck, partly in section to show the construction, and showing in dotted lines its position when taking up a load. Fig. 2 is a top view of the same.

Similar letters of reference indicate corresponding parts.

The object of this invention is to furnish improved trucks for picking up and carrying laterally or longitudinally railroad-rails, iron bars, shafts, bundles of iron, &c., and which shall be simple in construction and convenient in use.

The invention consists in the combination of the swiveled hook-plate, the T-plate, the pivoted hook, and the rods pivoted to each other, with the widened lower end of the draw-bar, the axle, and the wheels, as hereinafter fully described.

A are the small wheels, secured to the ends of the short axle B by nuts or other suitable means. C is a bar, four feet, more or less, in length, the lower end of which is widened, and has two short downwardly-projecting arms formed upon its sides, in holes in which the axle B turns. D is a plate, the ends of which are bent upward at right angles, and have hooks d' formed upon them. The hook-plate D is swiveled at its center to the center of the flat upper side of the widened lower end of the bar C by a bolt or rivet, E. To the swiveled hook-plate D is attached a T-plate, F, the outer end of which projects, and has a hook, G, pivoted to it. Through a hole in the middle part of the hook G is passed the eye-ring or loop formed upon the lower end of the rod H, which eye is made so large as to allow the plate D and hook G to turn through a quarter of a revolution in either direction. The upper end of the rod H is pivoted to the lower end of the rod I, which passes up along the bar C, through keepers c', attached to said bar C, and is made of such a length that its upper end does not reach quite to the upper end of the bar C. Upon the upper ends of the bar C and rod I are formed handles for convenience in operating the truck.

In using the truck, it is backed up to the bar, shaft, bundle, or other object to be carried, and the bar C is raised until the hooks d' rest against the side of the said rail, shaft, bundle, or other object, and at the same time the rod I is drawn upward, so that the hook G may pass over and take hold of the said object. The bar C is then lowered, which raises the load above the wheels A, and it may then be transferred laterally by drawing the truck.

If the load is to be transferred longitudinally, the bar C is turned to bring it parallel with the load, and it is then drawn forward.

The truck is unloaded by raising the bar C until the load rests upon the ground. The hook G is then raised by pulling upon the rod I, and the truck is drawn off.

Having thus described my invention, I claim as new and desire to secure by Letters Patent—

The combination of the swiveled hook-plate D d', the T-plate F, the pivoted hook G, and the rods H I with the widened lower end of the bar C, the axle B, and the wheels A, substantially as herein shown and described.

CHARLES W. CARTER.

Witnesses:
  WILLIAM BONNEY,
  GEO. W. TARLTON.